Sept. 30, 1969    J. J. RUBIN ET AL    3,470,017
IRIDIUM CRUCIBLES AND TECHNIQUE FOR EXTENDING
THE LIFETIME THEREOF BY COATING WITH
ZIRCONIUM OR ZIRCONIUM OXIDE
Filed Nov. 5, 1965
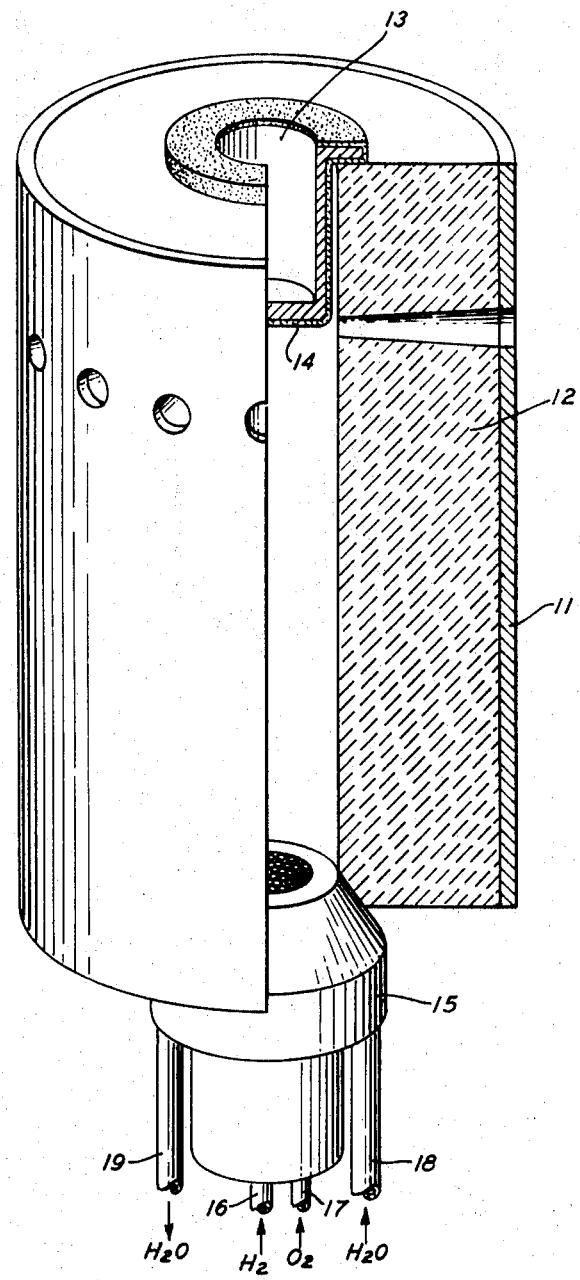
INVENTORS J. J. RUBIN
L. G. VAN UITERT
BY
Edward M. Fink
ATTORNEY

United States Patent Office 3,470,017
Patented Sept. 30, 1969

3,470,017
IRIDIUM CRUCIBLES AND TECHNIQUE FOR EXTENDING THE LIFETIME THEREOF BY COATING WITH ZIRCONIUM OR ZIRCONIUM OXIDE
Jerry J. Rubin, Clark, and Le Grand G. Van Uitert, Morris Township, Morris County, N.J., assignors to Bell Telephone Laboratories Incorporated, New York, N.Y., a corporation of New York
Filed Nov. 5, 1965, Ser. No. 506,490
Int. Cl. B05b 7/20; B01l 3/04
U.S. Cl. 117—105.2         5 Claims

ABSTRACT OF THE DISCLOSURE

The useful lifetime of an iridium crucible destined for use in high temperature crystal growth techniques may be enhanced by encasing the crucible in a thin film of zirconium or zirconium oxide.

---

This invention relates to a technique for extending the lifetime of iridium crucibles destined for use in the preparation of high melting point oxides and to the resultant crucibles.

In recent years, considerable ingenuity and skill has been devoted to the development and engineering of apparatus for growing crystals from a melt. Unfortunately, crucible failure has been a major problem in the industry, so limiting the degree of control over growth conditions essential for the production of high quality crystals.

Among the most common crucible materials utilized for such purposes is platinum. However, the efficacy of platinum crucibles is restricted to those processes employing maximum temperature within the range of 1400–1500° C., that is, temperatures approaching that at which platinum begins to melt. Accordingly, workers in the art focused their interest upon iridium as a crucible material for use in high temperature oxide crystal growing techniques.

Although iridium crucibles are in widespread use for such purposes, inherent disadvantages are apparent in that iridium oxidizes at a rapid rate at temperatures beyond 1500° C., thereby necessitating means to protect the crucible from degradation.

In accordance with the present invention, it has been determined that the useful lifetime of iridium crucibles may be effectively enhanced by encasing the crucible within a thin film of zirconium or zirconium oxide. Crucibles prepared in accordance with the described technique have been found to evidence useful lifetimes of three times greater or higher than conventional prior art ridium crucibles.

The invention will be more readily understood from the following detailed description taken in conjunction with the accompanying drawing wherein:

The figure is a perspective view, partly in section, of an exemplary apparatus, including an iridium crucible, utilized in high temperature crystal pulling techniques.

With reference now, more particularly, to the figure, there is shown an apparatus embodying the inventive crucible. Shown in the figure is a cyindrical combustion chamber 11 having an inner lining comprising a casting of zirconium oxide 12. Disposed within chamber 11 is flanged iridium crucible 13 having an external coating comprising a thin film of zirconium or zirconium oxide 14. A burner 15 having means for the introduction of hydrogen and oxygen 16 and 17, respectively, and cooling means for the ingress and egress of water 18 and 19, respectively, providing the source of heat.

In accordance with the inventive technique, a conventional iridium crucible, typically having a wall 60 mils in thickness, is protected by the deposition thereon externally of a thin adherent coating of zirconium or zirconium oxide. It has been found that zirconium coatings may range in thickness from 0.1 to 5 mils and zirconium oxide coatings may range from 1–20 mils in thickness. It has been found that the use of thicknesses less than the noted minima fail to provide the protection required to enhance crucible lifetime whereas the use of thicknesses appreciably beyond the noted maxima result in scaling or flaking from the crucible walls. The inventive coating may be applied to the crucible by any well known deposition technique, as for example, flame spraying, casting the metal or oxide about the crucible, electrolytic deposition, et cetera.

It will be appreciated by those skilled in the art that the inventive crucibles may be used in the preparation of any material requiring temperatures of the order of 1500° C. and higher. Thus, the described crucibles are of particular interest for use in the growth of such commercially important materials as yttrium aluminum garnet, calcium tungstate, yttrium vanadates, ruby, et cetera.

The present invention is conveniently described by reference to an illustrative example wherein yttrium vanadate was grown in a crucible of the invention.

An iridium crucible having a wall thickness of 0.060 inch, obtained from commercial sources, was sandblasted externally by conventional techniques in order to form a clean surface thereon. Next, a zirconium oxide coating having a thickness of approximately 10 mils was deposited by spraying the cleansed crucible surface by means of a commercial spray gun having on oxy-acetylene gas jet tip, a zirconium rod being employed as the source material. The resultant coated crucible was next inserted in an apparatus similar to that shown in the figure and heated to a temperature of approximately 1900° C., a stream of argon being passed thereover. Following, 75 grams of powdered yttrium vanadate were added to the crucible incrementally. Then, the temperature was elevated to 2000° C. at which point the charge was entirely liquid but for the upper surface thereof which remained solid. A ¼ inch hole was then punched through this solid crust with an iridium rod and the molten condition held for one hour to harden the crust. Next, the hole was enlarged to 1 inch and additional yttrium vanadate (50 grams) added until the surface of the melt was ¼ inch below the lip formed by the crust. The temperature of the melt was then lowered to 1940° C. and a seed crystal of yttrium vanadate inserted itno the molten mass. The Czochralski technique of pulling crystals from the melt was then employed to grow yttrium vandate to ½ inch diameter at a growth rate of ¼ inch per hour and a rotation rate of 25 r.p.m. Oxidation data obtained for the inventive crucible revealed that the iridium oxidized at a rate of loss of 0.50 mg./sq. cm./hr. at 1500° C. and 0.65 mg./sq. cm./hr. at 2000° C.

For comparative purposes, the procedure delineated above wase repeated with an uncoated iridium crucible. The rate of iridium loss at 1500° C. was 1.5 mg./sq. cm./hr. and at 2000° C. 2.0 mg./sq. cm./hr. Thus, it is apparent that the useful lifetime of iridium crucible can be effectively extended by a factor of at least three by coating the crucible in accordance with the invention.

What is claimed is:

1. A method for extending the lifetime of an iridium crucible destined for use in preparing oxide materials at high temperatures which comprises depositing a coating of a least one material selected from the group consisting of zirconium and zirconium oxide upon the external surfaces of said iridium crucible, the thickness of said coating ranging from 0.1–5 mils for zirconium and from 1–20 mils for zirconium oxide.

2. A method in accordance with the procedure of claim 1 wherein said coating is deposited by flame spraying.

3. A method in accordance with the procedure of claim 1 wherein said coating is deposited by electrolytic deposition.

4. A method in accordance with claim 2 wherein said coating consists essentially of zirconium oxide.

5. An iridium crucible having an external coating consisting essentially of at least one material selected from the group consisting of zirconium and zirconium oxide, the thickness of said coating ranging from 0.1–5 mils for zirconium and from 1–20 mils for zirconium oxide.

References Cited

UNITED STATES PATENTS

| | | | |
|---|---|---|---|
| 2,828,251 | 3/1958 | Sibert et al. | 204—39 |
| 3,184,292 | 5/1965 | Argyriades et al. | 117—131 XR |
| 3,269,856 | 8/1966 | Jones | 117—105.2 XR |

FOREIGN PATENTS

| | | |
|---|---|---|
| 213,359 | 10/1956 | Australia. |
| 636,194 | 2/1962 | Canada. |
| 943,278 | 12/1963 | Great Britain. |

ALFRED L. LEAVITT, Primary Examiner

J. H. NEWSOME, Assistant Examiner

U.S. Cl. X.R.

23—292; 29—191; 117—93.1, 127, 130, 131, 138; 204—14; 263—48; 266—39